United States Patent [19]
Sugita et al.

[11] Patent Number: 5,427,869
[45] Date of Patent: Jun. 27, 1995

[54] MAGNETIC RECORDING MEDIUM AND METHOD FOR PRODUCING THE SAME

[75] Inventors: Ryuji Sugita; Kiyokazu Tohma; Tatsuaki Ishida; Yasuaki Ban, all of Osaka, Japan

[73] Assignee: Matsushita Electric Industrial Co., Ltd., Osaka, Japan

[21] Appl. No.: 103,759

[22] Filed: Aug. 10, 1993

[30] Foreign Application Priority Data

Aug. 14, 1992 [JP] Japan .................. 4-216757
Dec. 11, 1992 [JP] Japan .................. 4-331511

[51] Int. Cl.⁶ ........................... G11B 5/66
[52] U.S. Cl. .................. 428/684 T; 428/900; 427/599
[58] Field of Search ........... 428/684 T, 900, 684 TS; 427/599

[56] References Cited
FOREIGN PATENT DOCUMENTS

| | | |
|---|---|---|
| 0261240A1 | 3/1988 | European Pat. Off. . |
| 58-133625 | 8/1983 | Japan . |
| 60-201521 | 10/1985 | Japan . |
| 3-242818 | 10/1991 | Japan . |
| 4-119516 | 4/1992 | Japan . |
| 4-147418 | 5/1992 | Japan . |

OTHER PUBLICATIONS

Tohme, et al., "Angle on Magnetic Properties of Vacuum Deposited Co–Co–films", IEEE Translation Journal on Magnetics in Japan, vol. 6, No. 8, Sep. 1991, pp. 771–777.

*Primary Examiner*—L. Kiliman
*Attorney, Agent, or Firm*—Wenderoth, Lind & Ponack

[57] ABSTRACT

A magnetic recording medium includes a nonmagnetic substrate and a magnetic layer which is formed on a surface of the substrate and which has an axis of easy magnetization inclined from a direction to normal plane of the layer. An angular dependency of coercive force, of the medium which is measured by changing an application angle of a magnetic field in a range relative to −90° to +90° from the plane of the layer with a plane normal to the layer and including the axis of easy magnetization, has two local maximum values and two local minimum values. A ratio of the local maximum value closer to a plane direction to the minimum value closer of the layer to the local plane direction of the layer is from 1.6 to 2.4, and the local maximum value closer to the plane direction of the layer is larger than the local maximum value closer to the line normal to of the plane of the layer. The medium has a high S/N ratio.

1 Claim, 3 Drawing Sheets

MAGNETIC RECORDING MEDIUM AND METHOD FOR PRODUCING THE SAME

BACKGROUND OF THE INVENTION

1. Field of the Invention

The present invention relates to a magnetic recording medium which achieves a high S/N ratio and a method for producing the same.

2. Description of the Related Art

As the recording density of magnetic recording/reproducing equipment has been increased year by year, it is highly desired to provide a magnetic recording medium having excellent recording and reproducing characteristics in a short wavelength range. Today, a coating type magnetic recording medium in which magnetic powder is coated on a substrate is mainly used, and its properties are being improved to satisfy the above desire. However, such improvement is nearing its limit.

One of magnetic recording media which can exceed this limit is a thin film magnetic recording medium. The thin film magnetic recording medium is produced by a vacuum deposition method, a sputtering method or a plating method and has excellent recording and reproducing characteristics in a short wavelength range. Examples of magnetic materials used in the thin film magnetic recording medium are Co, Co-Ni, Co-Ni-P, Co-O, Co-Ni-O, Co-Cr, Co-Ni-Cr and the like.

In the practical production of magnetic tapes, the vacuum deposition method is most suitable, and a deposition tape comprising a Co-Ni-O magnetic layer is practically used as a Hi-8 type video tape.

One embodiment of the production method of a deposition tape will be explained by making reference to FIG. 1, which schematically illustrates an inner structure of a vacuum deposition apparatus.

A substrate 1 made of, for example, a polymer film is unwound from a supply roll 4, travels around a peripheral surface of a cylindrical can 2 in a direction of an arrow 6, and is finally wound on a take-up roll 5.

A vapor 9 of a raw magnetic material 7 such as metal cobalt or a cobalt alloy is evaporated from an evaporation source 8 and deposited on the substrate 1 to form a magnetic layer on the substrate 1. As the evaporation source 8, an electron beam evaporation source is preferred, since it can evaporate a high melting point metal such as cobalt at a high evaporation rate.

Between the evaporation source 8 and the cylindrical can 2, there are provided shielding plates 3A and 3B, which prevent excessive deposition of the evaporated atoms on the substrate.

Oxygen gas is supplied in a vacuum chamber from a nozzle 10 during the vapor deposition of the magnetic material.

The Hi-8 type video tape which is now commercially sold is usually produced by the above described apparatus.

In the Co-O or Co-Ni-O magnetic layer formed by the above method, the formed magnetic material has a columnar structure, and an axis of easy magnetization slants at a certain angle from a line normal to a plane of the magnetic layer. That is, the axis of easy magnetization is not in the line normal line to the plane of the magnetic layer or in the plane of the magnetic layer, but instead slants from the normal line in a plane including an incident direction of the atom vapor onto the substrate. In the commercially sold Hi-8 type video tape, an axis of easy magnetization slants at about 70° from the normal line of a magnetic layer in a plane including a longitudinal direction of the tape. The longitudinal direction of the tape corresponds to the running direction of the substrate in FIG. 1.

In the future, a magnetic recording/reproducing apparatus will have a smaller size and a larger capacity. To realize this, a linear recording density and a track density of the magnetic recording medium should be increased. Then, in the case of a magnetic tape, a high S/N ratio in particular in a short wavelength range should be increased.

SUMMARY OF THE INVENTION

An object of the present invention is to provide a magnetic recording medium which achieves a high S/N ratio.

Another object of the present invention is to provide a method for producing a magnetic recording medium which achieves a high S/N ratio.

According to the present invention, there is provided a magnetic recording medium comprising a nonmagnetic substrate and a magnetic layer which is formed on a surface of said substrate and has an axis of easy magnetization slanting from a normal line of a layer plane, wherein an angular dependency of coercive force, which is measured by changing an angle from $-90°$ to $+90°$ from the layer plane in a normal plane including said axis of easy magnetization, has two maximum values and two minimum values, a ratio of the maximum value closer to a layer plane direction to the minimum value closer to the layer plane direction is from 1.6 to 2.4, and the maximum value closer to the layer plane direction is larger than the maximum value closer to the normal line of the layer plane.

With such a magnetic recording medium, a reproducing output is increased, and a level of noise is decreased, so that a high S/N ratio is achieved.

DETAILED DESCRIPTION OF THE INVENTION

Figure 1:
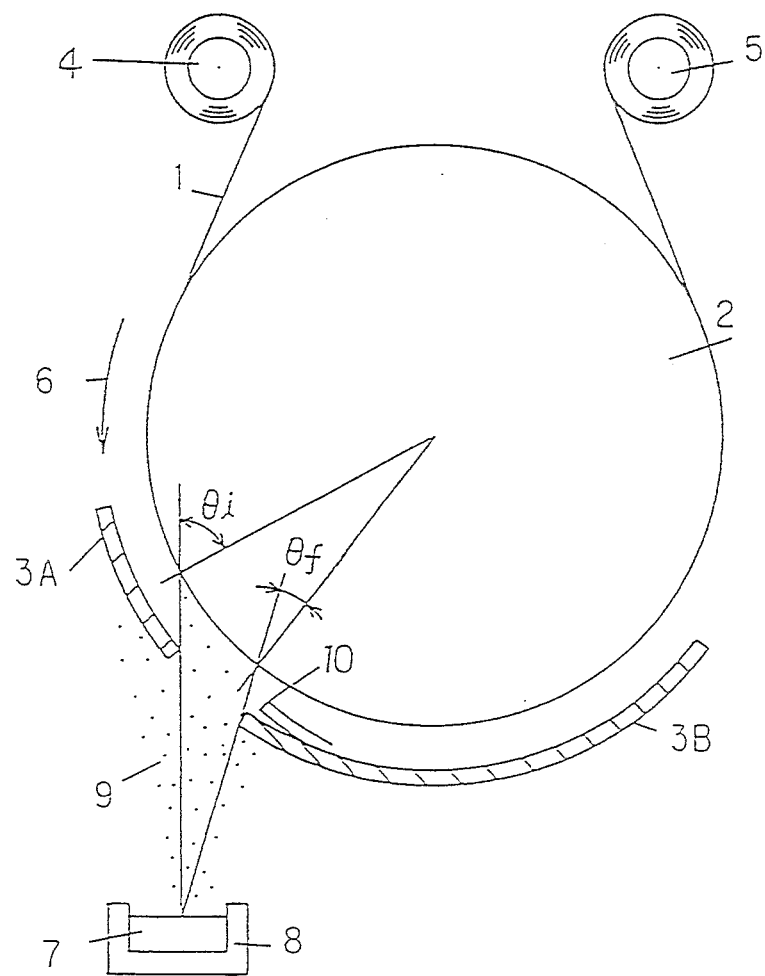
FIG. 1 schematically shows an embodiment of a vacuum deposition apparatus for producing a deposition magnetic recording medium.

First, an example of a method for producing a magnetic recording medium according to the present invention is explained with reference to FIG. 1.

To form the magnetic layer, the substrate 1 is made to travel around the peripheral surface of the cylindrical can 2 in the direction of the arrow 6. Between the evaporation source 8 and the cylindrical can 2, the shielding plates 3A and 3B are provided. Through a gap between two shielding plates 3A and 3B, the metal vapor 9 is deposited on the surface of substrate 1.

As the evaporation raw material 7, a bulk of Co or a Co alloy such as Co-Ni is filled in the evaporation source 8. During the deposition of the metal, the oxygen gas is supplied from the nozzle 10.

$\theta_i$ and $\theta_f$ represent indicent angles at which the metal vapor 9 is impinged on the substrate at a deposition initiating point and a deposition finishing point, respectively. Preferably, $\theta_i$ is 85° or smaller, and $\theta_f$ is 55° or larger.

In the above fundamental arrangement of the apparatus, an amount of supplied oxygen gas, a position of the nozzle 10 for supplying the oxygen gas, a direction of a stream of supplied oxygen gas, a distance between the shielding plates 3A and 3B and the peripheral surface of the cylindrical can 2, a residual gas pressure, a position of the evaporation source 8, an evaporation rate of the raw material metal 7, and the like are adjusted, so as to form a magnetic layer which has an oxygen concentration of from 6 atomic % to 35 atomic %, a slanting angle of a columnar grain to the normal line of the layer plane of from 50° to 70° in a whole range from an interface with the substrate 1 to the surface of the magentic layer, and an axis of easy magnetization which slants from a line normal to the plane of the layer. To achieve the high S/N ratio, the oxygen gas is preferably supplied to the atom vapor near the deposition finishing point.

When the oxygen concentration or the slanting angle of the columnar grain to the line normal to the plane of the layer is outside the above range, it is difficult or impossible to form a magnetic layer which has an axis of easy magnetization slanting from a normal line of a layer plane, and in which the angular dependency of coercive force measured by changing an angle in a normal plane including the axis of easy magnetization has two (local) maximum values and two (local) minimum values, a ratio of the maximum value closer to a plane direction to the minimum value closer to the plane direction is from 1.6 to 2.4, and the maximum value closer to the plane direction is larger than the maximum value closer to the normal line of the plane.

To form the magnetic layer having the dependency of coercive force on the applying angle of magnetic field, the raw material can be Co or Co-Ni to which at least one additive element may be added. Usually, the content of Co is at least 85 atomic % based on the total amount of the atoms except oxygen in the magnetic layer, and a saturation magnetization of the formed magnetic layer is from 450 kA/m to 850 kA/m.

The oxygen concentration in the magnetic layer can be quantitatively measured by a Rutherford back scattering analysis or an Auger electron spectroscopy. The slanting angle of the columnar grain in the magnetic layer can be measured by observing a cut surface of the magnetic layer with a scanning or transmission electron microscope.

Figure 2:
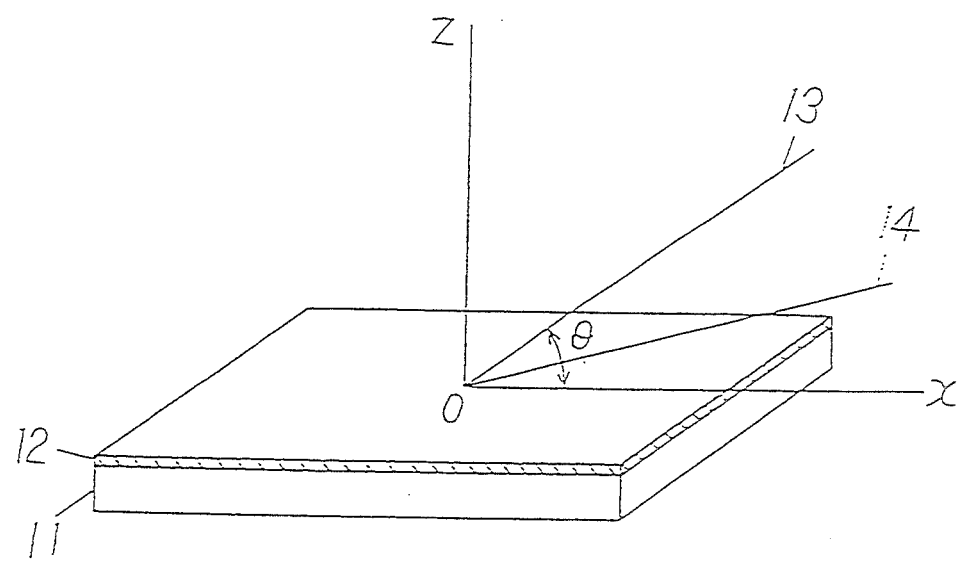
FIG. 2 illustrates a method for measuring a dependency of coercive force on an applying angle of the magnetic field.

The measurement of the coercive force of the produced magnetic recording medium will be explained by making reference to FIG. 2.

With a sample of magnetic recording medium comprising a substrate 11 and a magnetic layer 12, a hysteresis curve is measured using a VSM (vibrating sample type magnetometer). As shown in FIG. 2, while the magnetic field is applied in a direction of an angle $\theta$ from the layer plane, namely the direction 13, the hysteresis curve is recorded in this direction, and the coercive force is determined. The angle $\theta$ is changed from $-90°$ to $+90°$, and the coercive force is measured at each angle $\theta$. In FIG. 2, the x axis is in the traveling direction of the substrate during formation of the magnetic layer, and the z axis is in the direction normal to the plane of the layer. Since the axis of easy magnetization is present in a plane including both the x and z axes, the magnetic field is applied in this plane while varying the applying direction. That is, the coercive force is measured in the plane including the axis of easy magnetization 14 and the normal line of the layer plane.

Figure 3:
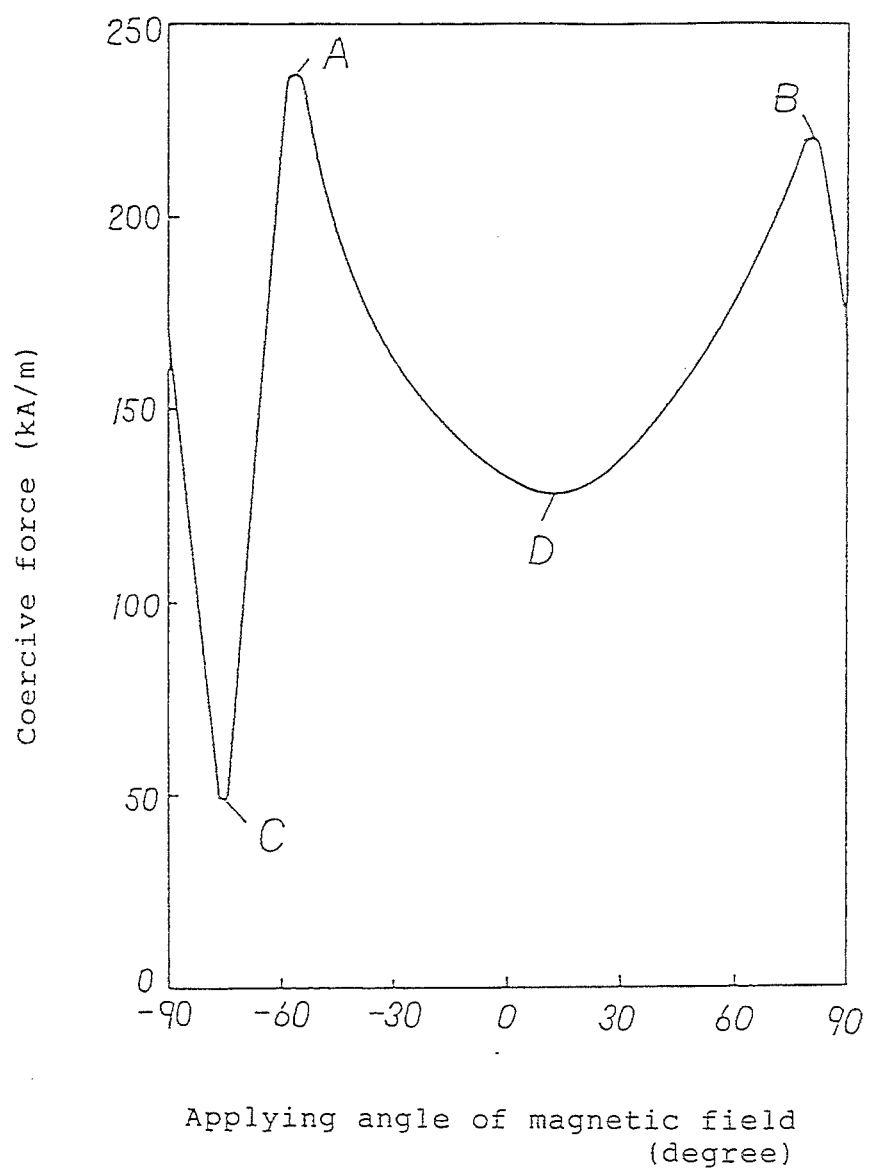
FIG. 3 is a graph showing a dependency of a coercive force on an applying angle of the magnetic field in an example of the magnetic recording medium according to the present invention.

FIG. 3 shows an example of the relationship between the coercive force and the direction of applied magnetic field ($\theta$). The abscissa represents the angle ($\theta$) of the direction of applied magnetic field from the layer plane (x axis), and the ordinate represents the coercive force.

In general, the dependency curve of coervice force on the applying angle of magnetic field has two maximum values and two minimum values in the case of a magnetic recording medium in which the axis of easy magnetization slants from the normal line of the layer plane. In FIG. 3, two maximum values are represented by "A" and "B", and two minimum values are represented by "C" and "D".

Since the angle of 0° corresponds to the direction of the layer plane, while the angle of $\pm 90°$ corresponds to the normal line of the layer plane, the maximum value A is that closer to the layer plane direction, while the maximum value B is that closer to the normal line of the layer plane. The minimum value C is that closer to the normal line to the layer plane, while the minimum value D is that closer to the layer plane direction.

According to the present invention, a relationship among the structure of the magnetic layer having the axis of easy magnetization which slants from the normal line to the layer plane, the dependency of coercive force on the applying angle of magnetic field, and the recording and reproducing characteristics of the magnetic recording medium is clarified by producing many magnetic recording media with changing the production conditions including the positions of shielding plates, the evaporation rate of the raw material metal, the position of evaporation source, a temperature of the substrate, the residual gas pressure, the manner for supplying the oxygen gas, the amount or rate of the supplied oxygen gas, and the like. Then, it has been found that, when an average oxygen concentration in the magnetic layer is from 6 to 35 atomic %, and the slanting angle of the columnar grain from the normal line to the layer plane is from 50° to 70° in the whole range from the interface with the substrate to the surface of the magentic layer, the coercive force has the dependency on the applying angle of magnetic field in the measurement as shown in FIG. 3, and the magneic recording medium has the high S/N ratio. That is, when the dependency curve of coercive force on the applying angle of magnetic field has two maximum values A and B and two minimum values C and D, and a ratio of the maximum value A which is closer to the layer plane direction than the other to the minimum value D which is closer to the layer plane direction than the other, namely a ratio A/D is from 1.6 to 2.4 and also the maximum value A is larger than the maximum value B which is closer to the normal line of the layer plane than the maximum value A, the very high S/N ratio is achieved. If either one of the above conditions is not met, the S/N ratio is decreased.

For example, when the ratio A/D is less than 1.6, the reproducing output is decreased in the whole band range. This may be due to the large dispersion of magnetic anisotropy. When the ratio A/D exceeds 2.4, the reproducing output in the short wavelength range is deteriorated, and the noise is incresed in the whole band range. Reasons for this may be that, since the axis of easy magnetization is too close to the layer plane direction, the recording magnetization amount is decreased by the self-demagnetizaion in the short wavelength range, and a saw-tooth form magnetization transition range is generated.

When the maximum value A closer to the layer plane direction is smaller than the maximum value B closer to the normal line of the layer plane, the output is also decreased. A reason for this has not been clarified.

To form the magnetic layer having the dependency of coercive force on the applying angle of magnetic field according to the present invention, the production method as described above can be employed. The production conditions can be easily optimized by producing some magnetic recording media with changing the production conditions such as the positions of shielding plates, the evaporation rate of the raw material metal, the position of evaporation source, the substrate temperature, the residual gas pressure, the manner for supplying the oxygen gas, the amount or rate of the supplied oxygen gas, and the like, since, as is well known, performances of the vacuum deposition apparatuses differ from one another.

Instead of forming the magnetic layer directly on the substrate surface, a non-magnetic layer such as CoO may be formed on the subsrate surface and then the magnetic layer is formed on the non-magnetic layer, whereby the magnetic layer having the dependency of coercive force on the applying angle of magnetic field can be easily obtained.

PREFERRED EMBODIMENTS OF THE INVENTION

The present invention will be explained further in detail by the following examples.

EXAMPLES

Using the apparatus shown in FIG. 1, Co-O layer having a thickness of 0.1 to 0.15 $\mu$m was formed on a polyethylene naphthalate film having a thickness of 7 $\mu$m as the substrate 1. In the evaporation source 8, metal cobalt was filled as the raw material 7 and vaporized. The cylindrical can 2 had a diameter of 1 m.

Various magnetic layers were formed by varying the positions of shielding plates, the position of evaporation source, the temperature of the substrate, the position of the nozzle for supplying the oxygen gas, the amount or rate of the supplied oxygen gas, an average deposition rate of the magnetic layer, and the like.

Then, with the produced magnetic recording media, the dependency of coercive force on the applying angle of magnetic field was measured, and the ratio A/D and the ratio A/B were calculated. The result are shown in the Table.

With the magnetic recording media $a_1$ to $a_4$, the ratio A/D was in the range between 1.6 and 2.4 and A was larger than B. Thus, the requirements of the present invention were satisfied.

The oxygen concentrations in the magnetic layers of the media $a_1$ to $a_4$ were measured by the Rutherford back scattering analysis to find that they were from 15 to 25 atomic %. The observation of the magnetic layers by the transmission electron microscope confirmed that the slanting angle of columnar grain from the normal line of the layer plane was from 56° to 62° in the whole range from the interface with the substrate to the surface of the magentic layer.

The magnetic recording-media b, c, d and e were comparative media, and did not satisfy the requirements of the present invention.

The magnetic recording medium f was a commercially available Hi-8 type deposition video tape, and its A/D was 1.4, and A was smaller than B. Accordingly, the video tape f did not satisfy the requirements of the present invention.

In the magnetic recording media b to f, the slanting angle of the columnar grain from the normal line of the layer plane was less than 50° near the surface of the magnetic layer.

The magnetic recording media $a_1$ to $a_4$ according to the present invention were produced under the following conditions:

Incident angle $\theta_i$: 80°
Incident angle $\theta_f$: 60°-70°
Substrate temperature: 0°-100° C.
Position of nozzle for supplying oxygen gas: see FIG. 1
Rate of oxygen gas: 0.7-0.9 liter/min.
Av. deposition rate of the magnetic layer: 0.3 $\mu$m/sec.

Each of the media $a_1$ to $a_4$ and b to e was slit to form a magnetic tape, and its recording and reproducing properties were evaluated using a ring-type magnetic head made of Sendust having a gap length of 0.15 $\mu$m. The reproducing output and noise are shown in the Table. The properties of the medium f evaluated under the same conditions are also shown in the Table.

The reproducing output was measured at a recording wavelength of 0.4 $\mu$m, and the noise was a modulation noise at a frequency which was 1 MHz smaller than the frequency of recorded signals when the signals having a recording wavelength of 0.4 $\mu$m was recorded. The recording output and the noise in the Table are represented as relative values with those of the medium f being 0 dB.

TABLE

| Medium | A/D | A/B | Reproducing output (dB) | Noise (dB) |
| --- | --- | --- | --- | --- |
| $a_1$ | 1.6 | >1 | +3 | −1 |
| $a_2$ | 1.8 | >1 | +4 | −1 |
| $a_3$ | 2.0 | >1 | +4 | −1 |
| $a_4$ | 2.4 | >1 | +3 | 0 |
| b | 1.2 | <1 | 0 | 0 |
| c | 2.6 | >1 | 0 | +1 |
| d | 2.0 | <1 | +1 | 0 |
| e | 1.5 | >1 | +1 | −1 |
| f | 1.4 | <1 | 0 | 0 |

As seen from the results in the Table, the magnetic recording media $a_1$ to $a_4$ according to the present invention had 3-4 dB higher reproducing output, and about 1 dB lower noise than or equal noise to the commercially sold Hi-8 deposition video tape.

The magnetic recording media b, c, d and e, which did not satisfy the dependency of coercive force on the applying angle of magnetic field according to the present invention, had smaller reproducing output than the media of the present invention and the noise equal to or higher than the media of the present invention. Accordingly, the magnetic recording-media of the present invention had much larger S/N ratio than those which did not satisfy the dependency of coercive force on the applying angle of magnetic field according to the present invention.

It was impossible to produce any magnetic recording medium having an A/D ratio of larger than 2.4 and an A/B ratio of smaller than 1.

While, in the above examples, Co-O was used as the magnetic material, the high S/N ratio can be achieved when Co-Ni-O or a Co-base magnetic material which may contain a slight amount of an additive element is used, insofar as the requirements of the present invention are fulfilled. Anyway, to satisfy the dependency of coercive force on the aapplying angle of magnetic field, the content of cobalt should be at least 85 atomic % based on the total amount of the atoms except oxygen atoms in the magnetic layer.

While the poyethylene naphthalate film was used in the above examples, other conventional polymer films such as a polyethylene terephthalate film, a polyimide film, a polyamide film, a polyetherimide film and the like may be used as the substrate.

In addition, the incident angles $\theta_i$ and $\theta_f$, the substrate temperature, the amount of supplied oxygen gas, the deposition rate, the thickness of magnetic layer and the thickness of substrate are not limited to those used in the above examples.

While a single layer magnetic layer was formed in the above examples, it is possible to form a multilayer magnetic layer, whereby the high S/N ratio can be achieved also.

Instead of forming the magnetic layer directly on the substrate, a nonmagneic intermediate layer can be formed from CoO, CoNiO, Ti, Cr or other nonmagnetic materials, and the magnetic layer is formed on the nonmagnetic intermediate layer. In such case, the same results as above can be obtained also.

What is claimed is:

1. A magnetic recording medium comprising a nonmagnetic substrate and a magnetic layer which is formed on a surface of said substrate and has an axis of easy magnetization which is inclined relative to a direction extending normal to a plane of said magnetic layer, wherein a plot of an angular dependency of coercive force to a magnetic field, which is measured by changing an application angle of a magnetic field in a range from $-90°$ to $+90°$ relative to the plane of the magnetic layer within a plane which is normal to said magnetic layer and which includes said axis of easy magnetization, has first and second local maximum values and first and second local minimum values, wherein the first local maximum value is obtained by a first application angle of the magnetic field which has an absolute value closer to 0° than a second application angle of the magnetic field used to obtain the second local maximum value, and wherein the first local minimum value is obtained by a third application angle of the magnetic field which has an absolute value closer to 0° than a fourth application angle of the magnetic field used to obtain the second local minimum value, wherein a ratio of the first local maximum value to the first local minimum value is from 1.6 to 2.4, and wherein the first local maximum value is larger than the second local maximum value.

* * * * *